United States Patent
Carmon et al.

(10) Patent No.: US 7,269,407 B2
(45) Date of Patent: Sep. 11, 2007

(54) VALIDATING AN INVOICE IN A WIRELESS TELECOMMUNICATION SYSTEM

(75) Inventors: Betty Jane Carmon, Crystal Lake, IL (US); Gay Lynn Nechvatal, Elgin, IL (US); John Carmen Guido, St. Charles, IL (US); George J. Ondercin, III, Bay Village, OH (US); Joyce T. Horiuchi, Hoffman Estates, IL (US); Kathleen Russell, East Dundee, IL (US); Ona I. Taylor, Hoffman Estates, IL (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 10/247,244

(22) Filed: Sep. 19, 2002

(65) Prior Publication Data

US 2004/0058668 A1    Mar. 25, 2004

(51) Int. Cl.
*H04M 11/00* (2006.01)

(52) U.S. Cl. .............. 455/406; 455/408; 379/114.03; 379/114.04

(58) Field of Classification Search ............... 455/406, 455/408; 379/116, 118, 119, 121.01, 121.05, 379/126, 127.01, 114.03, 114.04
See application file for complete search history.

(56) References Cited

U.S. PATENT DOCUMENTS

| | | | |
|---|---|---|---|
| 5,287,270 A * | 2/1994 | Hardy et al. | 705/34 |
| 5,325,190 A * | 6/1994 | Nagasaki et al. | 348/270 |
| 6,144,726 A * | 11/2000 | Cross | 379/114.03 |
| 6,782,388 B2 * | 8/2004 | Majewski et al. | 707/10 |
| 2003/0036918 A1 * | 2/2003 | Pintsov | 705/1 |
| 2004/0010422 A1 * | 1/2004 | Michalski et al. | 705/2 |
| 2004/0049446 A1 * | 3/2004 | Seljeseth | 705/37 |

* cited by examiner

*Primary Examiner*—Binh K. Tieu
(74) *Attorney, Agent, or Firm*—Moazzam & Associates, LLC (57) ABSTRACT

A method that provides improved invoice validation in a wireless telecommunication system comprises receiving billing input data for a circuit and indicating a discrepancy if a billed amount and a calculated amount differ by greater than a threshold amount, the billing input data including the billed amount. In addition the method includes indicating billing parameters used to create the calculated amount.

28 Claims, 7 Drawing Sheets

VALIDATING AN INVOICE IN A WIRELESS TELECOMMUNICATION SYSTEM

DESCRIPTION OF THE INVENTION

1. Field of the Invention

The invention relates generally to systems and methods for validating invoices in a wireless telecommunication system, and more particularly, to systems and methods for validating invoices to a specific threshold amount in a wireless telecommunication system.

2. Background of the Invention

The use of telephone products and systems in the day-to-day lives of most people is continually growing. With the advent and steady growth of wireless telecommunications, wireless telecommunication systems will increasingly be utilized for not only voice data, but also for sending and receiving packetized data for use on the Internet, for example. In an effort to lower operating costs, increase system availability, and increase value for its subscribers, wireless telecommunications providers wish to validate invoices to a specific threshold amount for circuits within the wireless telecommunication system. Wireless telecommunication providers realize a time and a cost savings by validating invoices for circuits within the wireless telecommunication system.

Therefore, the need to efficiently provide improved invoice validation in a wireless telecommunication system has become a common need for many wireless telecommunication providers. More specifically, validating invoices to a specific threshold amount in the wireless telecommunication system has become a critical need for many wireless telecommunication providers. This is because in an increasingly competitive environment, meeting and exceeding the expectations of subscribers or others who receive services is essential for a wireless telecommunication provider.

One solution to the invoice validation problem is for a wireless telecommunication provider to manually calculate a correct amount for a particular invoice received from a circuit provider or vendor. Once the correct amount is manually calculated, the calculated amount may be compared to the billed amount. Once the comparison is made manually, a determination can be made as to whether a discrepancy, if detected, should be reconciled. In calculating the calculated amount, the correct contractual amount or correct amount as established by tariff must be obtained. Great inefficiencies are created in this procedure because, for example, obtaining the correct contractual or tariff data and associating them with a particular circuit may be very difficult given the large number of contracts, tariffs, and circuits for a given wireless telecommunication system. In addition, manually performing a validation is very time consuming. Accordingly, efficiently providing invoice validation in a wireless telecommunication system remains an elusive goal.

Thus, there remains a need for efficiently validating invoices in a wireless telecommunication system. In addition, there remains a need for systems and methods for validating invoices to a specific threshold amount in the wireless telecommunication system.

SUMMARY OF THE INVENTION

Consistent with the present invention, an improved invoice validation method and system are provided that avoid problems associated with prior art invoice validation systems and methods as discussed herein above.

In one aspect, an improved method for validating an invoice in a wireless telecommunication system comprises receiving billing input data for a circuit, indicating a discrepancy if a billed amount and a calculated amount differ by greater than a threshold amount, the billing input data including the billed amount, and indicating billing parameters used to create the calculated amount.

In another aspect, an improved system for validating an invoice in a wireless telecommunication system comprises a component for receiving billing input data for a circuit, a component for indicating a discrepancy if a billed amount and a calculated amount differ by greater than a threshold amount, the billing input data including the billed amount, and a component for indicating billing parameters used to create the calculated amount.

In yet another aspect, a computer-readable medium on which is stored a set of instructions for providing improved invoice validation in a wireless telecommunication system, which when executed perform stages comprising receiving billing input data for a circuit, indicating a discrepancy if a billed amount and a calculated amount differ by greater than a threshold amount, the billing input data including the billed amount, and indicating billing parameters used to create the calculated amount.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, an improved system for validating an invoice in a wireless telecommunication system comprises a component for receiving billing input data for a circuit, a component for indicating a discrepancy if a billed amount and a calculated amount differ by greater than a threshold amount, the billing input data including the billed amount, and a component for indicating billing parameters used to create the calculated amount.

Figure 1:
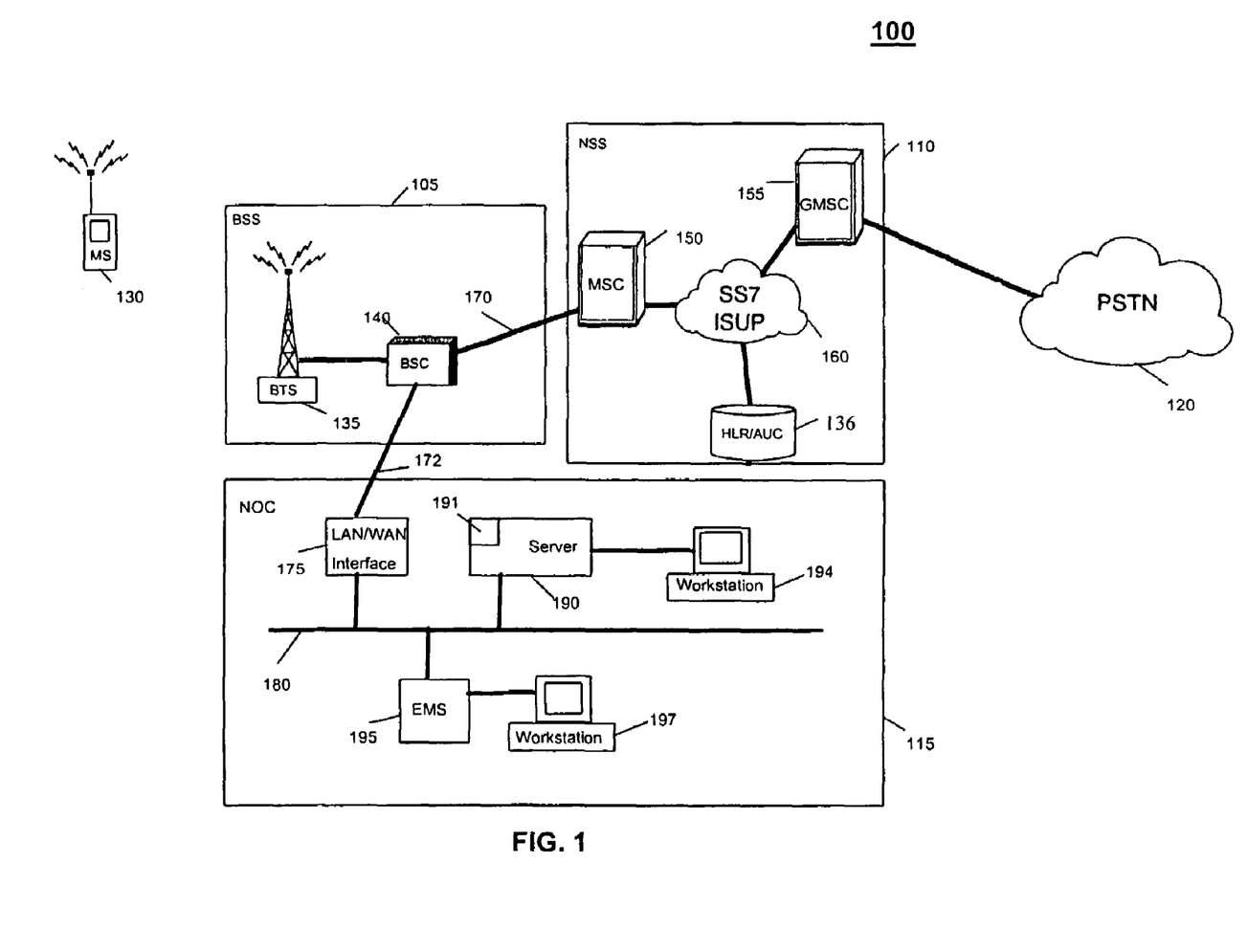
FIG. 1 is a functional block diagram of an exemplary wireless telecommunication system consistent with an embodiment of the present invention.

As herein embodied and illustrated in FIG. 1, an exemplary wireless telecommunication system 100 consistent with an embodiment of the present invention may comprise a base station subsystem (BSS) 105, a network and switching subsystem (NSS) 110, a network operation center (NOC) 115, a mobile station (MS) 130, and a publicly switched telephone network (PSTN) 120. The elements of system 100 will be described in greater detail below.

Consistent with an embodiment of the invention, the component for receiving billing input data for a circuit, the component for indicating a discrepancy, and the component for indicating billing parameters used to create the calculated amount may comprise an element management system (EMS) 195, a workstation 197, a server 190, or a workstation 194. Those of ordinary skill in the art, however, will appreciate that other elements of system 100 may comprise the component for receiving billing input data for a circuit, the component for indicating a discrepancy, and the component for indicating billing parameters used to create the calculated amount.

System 100 may utilize GSM technology enhanced with GPRS in embodiments of the present invention. Those of ordinary skill in the art will appreciate, however, that other wireless telecommunication technologies standards may be employed, for example, FDMA, TDMA, CDMA, CDMA 2000, UTMS, and EDGE, without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 140, and a base transceiver station (BTS) 135. BSS 105 connects to MS 130 through a radio interface and connects to NSS 115 through an interface 170. BSC 140 controls BTS 135 and may control a plurality of other base transceiver stations in addition to BTS 135. BTS 135 may comprise radio transmission and reception equipment located at an antenna site. Associated with BSS 105, a transcoder/rate adaption unit (TRAU) (not shown) may perform speech encoding and speech decoding and rate adaptation for transmitting data. As a subpart of BTS 135, the TRAU may be located away from BTS 135, for example, at a mobile switching center located in NSS 110. When the TRAU is located in this way, the low transmission rate of speech code channels allows more compressed transmission between BTS 135 and the TRAU.

Interface 170 between NSS 110 and BSS 105, and a wide area network 172 between BSC 140 and NOC 115, may comprise T-1 lines using X.25 or TCP/IP protocol, for example.

MS 130 may comprise a mobile phone, a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 130 may utilize cellular telephone protocols such as wireless application protocol (WAP), or blue-tooth protocol. Such mobile systems may also be configured to permit the user to purchase products through a browser on a display of the mobile device. The invention, as disclosed in this embodiment, in its broadest sense is not limited to a particular form of mobile system or communications protocol. And those of ordinary skill in the art will recognize that other systems and components may be utilized within the scope and spirit of the invention.

MS 130 may be a stand-alone piece of equipment for certain services or support the connection of external terminals, such as the interface for a personal computer or facsimile machine. MS 130 may include mobile equipment (ME) (not shown) or a subscriber identity module (SIM). The ME does not need to be personally assigned to one subscriber. GSM phones, for example, may use a SIM card that contains subscriber account information, as GSM phones may be automatically programmed by plugging in the SIM card. This allows GSM phones to be used interchangeably in situations such as renting or borrowing. When a subscriber's SIM is inserted into the ME of MS 130, all calls for the subscriber are delivered to MS 130. Thus, the ME is not associated with a particular number, but rather, is linked to the subscriber's SIM. In addition, GSM may include Short Messaging Service (SMS) that may enable text messages up to 160 characters in length to be exchanged from GSM phones.

Still referring to FIG. 1, NSS 110 may comprise a mobile switching center (MSC) 150, a first network 160, a home location register/authentication center (HLR/AUC) 136, and a gateway mobile switching center (GMSC) 155. NSS 110 manages the communication between subscribers, for example, a subscriber using MS 130, and other telecommunications users, for example, those using publicly switched telephone network (PSTN) 120. PSTN 120 may comprise, for example, the worldwide voice telephone network.

MSC 150 coordinates call set-up to and from subscribers such as system operator 125 using MS 130. MSC 150 may control several base station controllers such as, and similar to BSC 140. GMSC 110 is used to interface with external networks for communication with users outside of the wireless system, such users on PSTN 120.

HLR/AUC 136 may comprise a stand-alone computer without switching capabilities, a database which contains subscriber information, and information related to the subscriber's current location, but not the actual location of the subscriber. The AUC portion of HLR/AUC 136 manages the security data for subscriber authentication. Another subdivision of HLR/AUC 136 may include an equipment identity register (EIR) (not shown) which may store data relating to mobile equipment (ME).

NSS 110 may also include a visitor location register (VLR) (not shown). The VLR links to one or more mobile switching center located on other systems, temporarily storing subscription data of subscribers currently served by MSC 150. The VLR holds more detailed data than HLR/AUC 135. For example, the VLR may hold more current subscriber location information than the location information at HLR/AUC 136.

GMSC 155 is utilized to interface with PSTN 120. In order to set up a requested call, the call is initially routed to GMSC 155, that finds the correct home location register by knowing the director number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) in an ISDN user part (ISUP) protocol. ISUP defines the protocol and procedures used to setup, manage, and release trunk circuits that carry voice and data calls over a public switched telephone network. ISUP is used for both ISDN and non-ISDN calls. Calls that originate and terminate at the same switch do not use ISUP signaling.

Still referring to FIG. 1, network operation center (NOC) 115 may comprise a LAN/WAN interface 175, a local area network (LAN) 180, server 190, a database 191, workstation 194, element management system (EMS) 195, and workstation 197.

LAN/WAN interface 175 interfaces WAN 172 and LAN 180, thus connecting the elements connected to LAN 180 with BSC 140. A WAN may comprise a communications network that covers a wide geographic area, such as state or country, whereas a LAN may be contained within a building or complex connecting servers, workstations, a network operating system, and a communications link.

Server 190 or workstation 194 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. Workstation 194 may be used to interface with server 190 and while FIG. 1 shows workstation 194 located in NOC 115, those skilled in the art will appreciate that workstation 194 may be connected remotely to NOC 115 or server 190.

EMS 195 is a device used to detect, diagnose, and correct problems on system 100 effecting the security or reliability of system 100. Like server 190, EMS 195 may comprise a personal computer, a hand-held computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. Workstation 197 allows a NOC operator to interface with EMS 195. Workstations 194 and 197 may comprise, for example, a scalable performance architecture (SPARC) station marketed by SUN MICROSYSTEMS, Inc. of 901 San Antonio Road, Palo Alto, Calif. 94303-4900.

Figure 2:
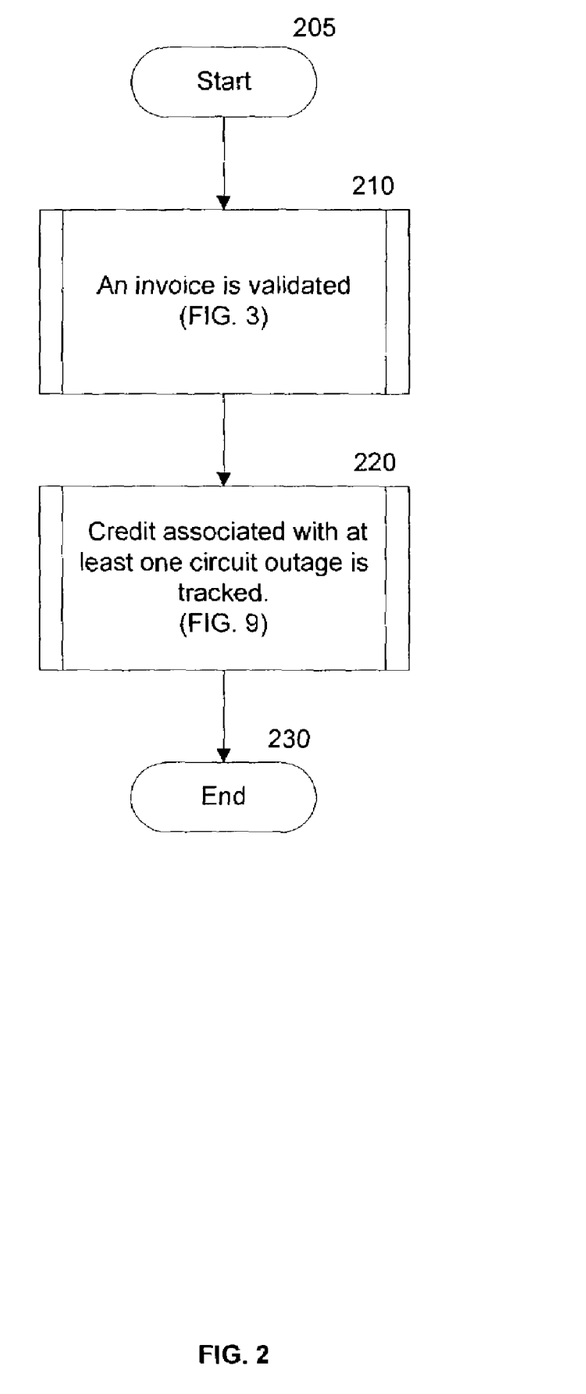
FIG. 2 is a flow chart of an exemplary method for facilitating payments for circuits in a wireless telecommunication system consistent with an embodiment of the present invention.
Figure 3:
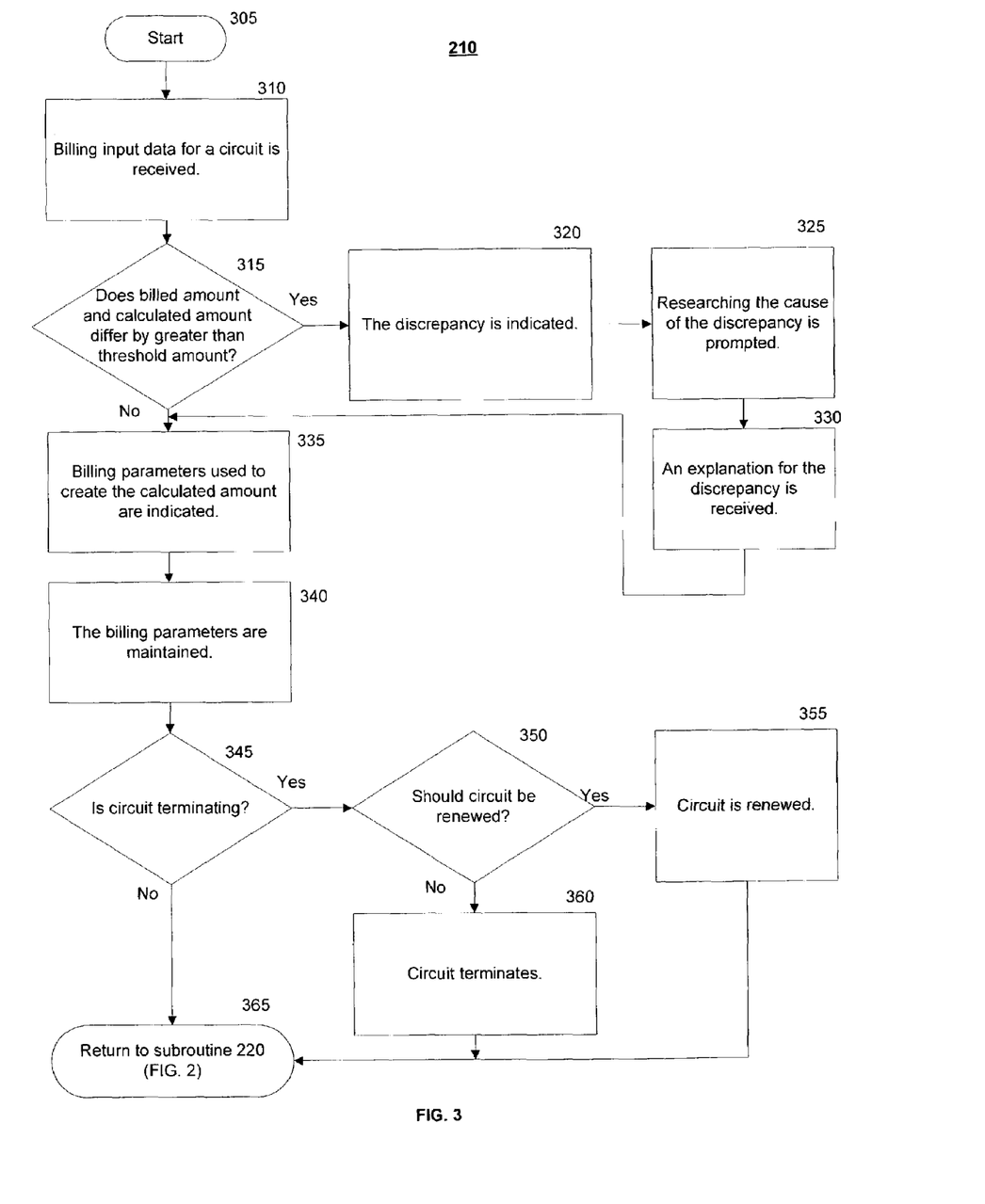
FIG. 3 is a flow chart of an exemplary subroutine used in the exemplary method of FIG. 2 for validating an invoice in a wireless telecommunication system consistent with an embodiment of the present invention.
Figure 9:
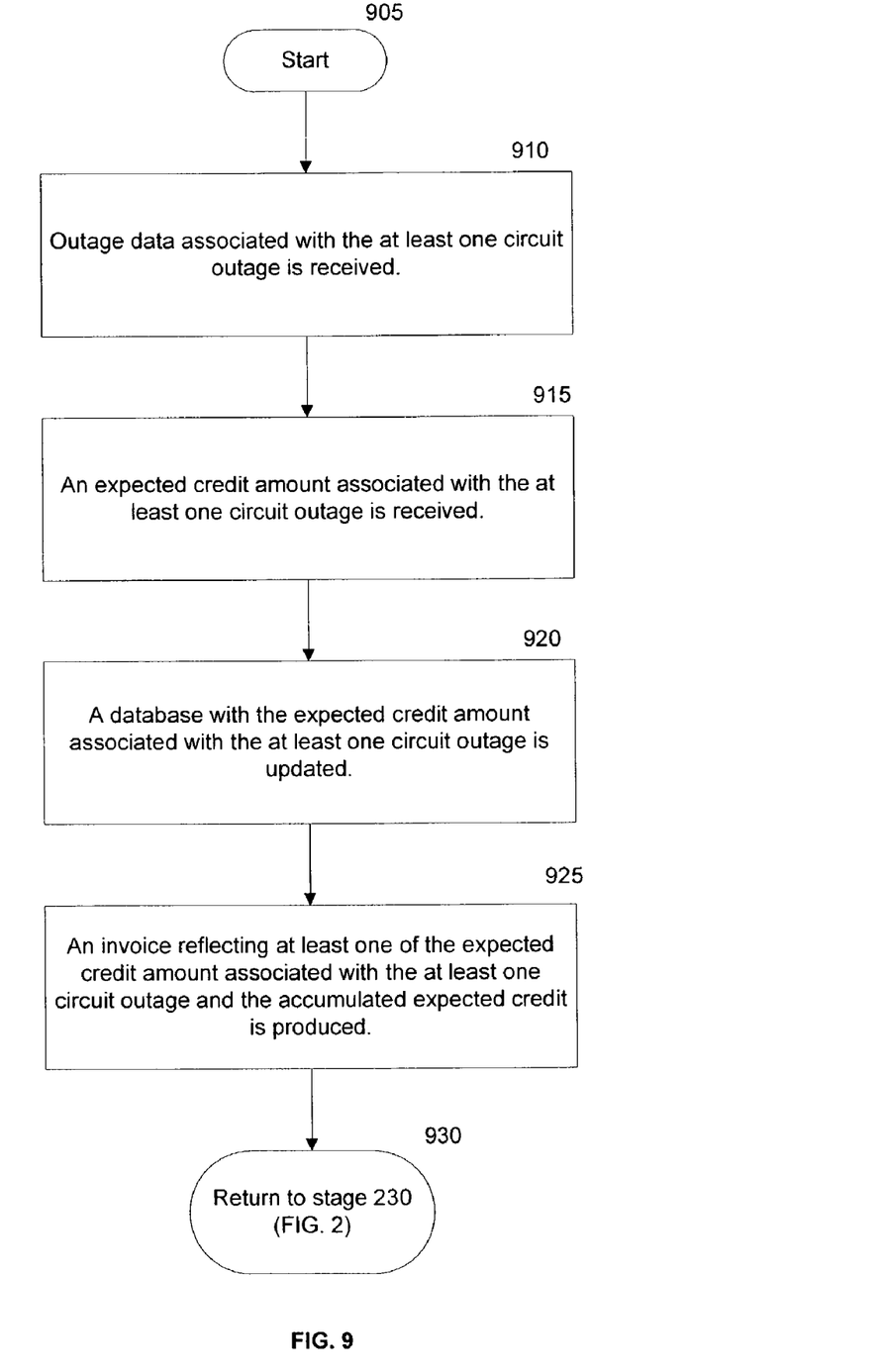
FIG. 9 is a flow chart of an exemplary subroutine used in the exemplary method of FIG. 2 for tracking credit associated with at least one circuit outage in a wireless telecommunication system consistent with an embodiment of the present invention.

FIG. 2 is a flow chart setting forth the general stages involved in exemplary method 200 for facilitating payments for circuits in a wireless telecommunication system consistent with an embodiment of the present invention. The implementation of the stages of exemplary method 200 in accordance with an exemplary embodiment of the present invention will be described in greater detail in FIG. 3 through FIG. 9. Exemplary method 200 begins at starting block 205 and proceeds to exemplary subroutine 210 where an invoice is validated. The stages of exemplary subroutine 210 are shown in FIG. 3 and will be described in greater detail below. From exemplary subroutine 210, where an invoice is validated, exemplary method 200 continues to exemplary subroutine 220 where credit associated with at least one circuit outage is tracked. The stages of exemplary subroutine 220 are shown in FIG. 9 and will be described in greater detail below. Once credit associated with at least one circuit outage is tracked in exemplary subroutine 220, exemplary method 200 ends at stage 230.

Figure 4:
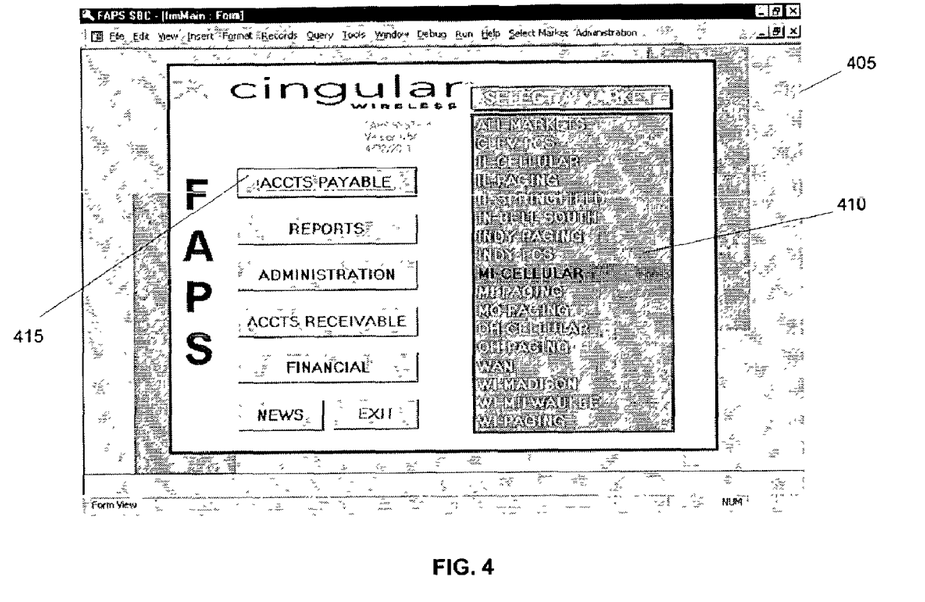
FIG. 4 is an illustration of an exemplary main screen consistent with an embodiment of the present invention.

FIG. 3 describes exemplary subroutine 210 from FIG. 2 for validating an invoice. Exemplary subroutine 210 begins at starting block 305 and continues to stage 310 where billing input data for a circuit is received. For example, through workstation 194 a user may initiate a programming module located on server 190, which when initiated produces the exemplary main screen 405 as illustrated in FIG. 4. Once main screen 405 is displayed on workstation 194, the user may choose a particular market corresponding to a geographic area containing a particular circuit in system 100. Once a market, for example, market 410, is chosen, a task such as accounts payable is chosen by clicking on accounts payable button 415.

Figure 5:
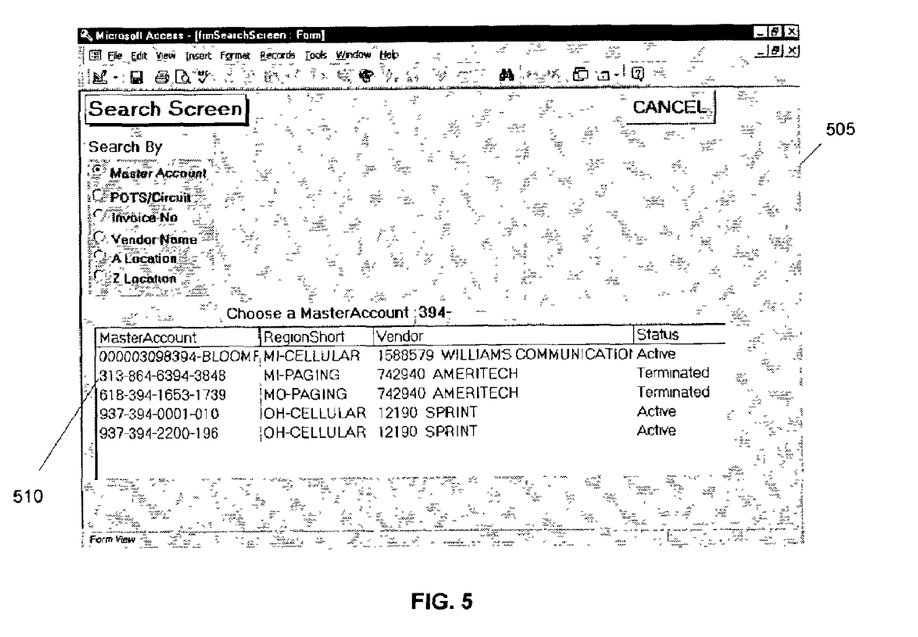
FIG. 5 is an illustration of an exemplary accounts payable lookup screen consistent with an embodiment of the present invention.
Figure 6:
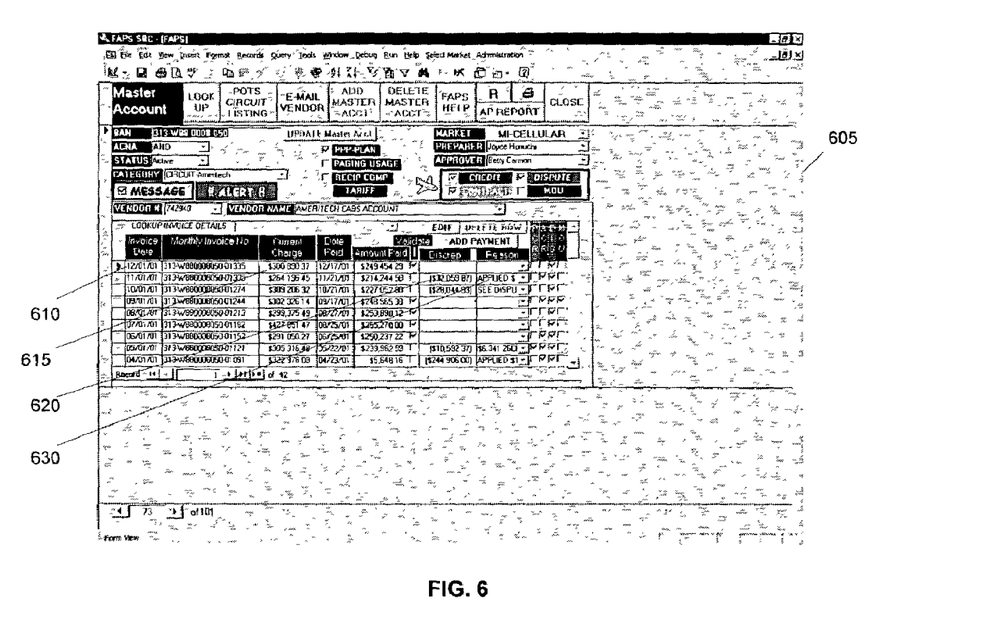
FIG. 6 is an illustration of an exemplary accounts payable main screen consistent with an embodiment of the present invention.

Once accounts payable button 415 is clicked, exemplary search screen 505 may be displayed as illustrated in FIG. 5. From this screen, a user may select a particular vendor account, for example, master account line 510. After master account line 510 is chosen, exemplary accounts payable main screen 605 may be displayed as illustrated in FIG. 6. On screen 605, billing input data such as a circuit number, date 610 an invoice for the circuit was received from the circuit vendor, or a billed amount 615 billed by the vendor for the use of the circuit my be entered.

From stage 310 where billing input data for a circuit is received, exemplary subroutine 210 advances to decision block 315 where it is determined if the billed amount and a calculated amount differ by greater than a predetermined threshold amount. The threshold amount may be any amount greater than or equal to 0%. For example, a calculated amount for the circuit may be calculated from billing parameters stored on server 190. An operator of system 100 may have a contract with a vendor for a particular circuit. The contract may indicate, for example, the billing parameters including a monthly charge for use of a particular circuit. Alternatively, the billing parameters may be specified by a tariff established by government regulation also stored on server 190.

From the billed amount entered in stage 310 and from the calculated amount, a discrepancy between the two may be calculated. If it is determined at decision block 315 that the billed amount and the calculated amount differ by greater than the threshold amount, exemplary subroutine 210 advances to stage 320 where the discrepancy is indicated. For example, discrepancy 620 may be displayed on screen 605 as illustrated in FIG. 6.

Once the discrepancy is indicated in stage 320, exemplary subroutine 210 advances to stage 325 where researching the cause of the discrepancy is prompted. For example, at this point, the user may review records or consult other associates with the vendor in an attempt to determine why the calculated amount and the billed amount differ by greater than the threshold amount.

After researching the cause of the discrepancy is prompted in stage 325, exemplary subroutine 210 advances to stage 330 where an explanation for the discrepancy is received. For example, the reason may simply be that the vendor over billed the amount. The reason determined may be entered into area 630 as shown on screen 605 of FIG. 6.

Figure 7:
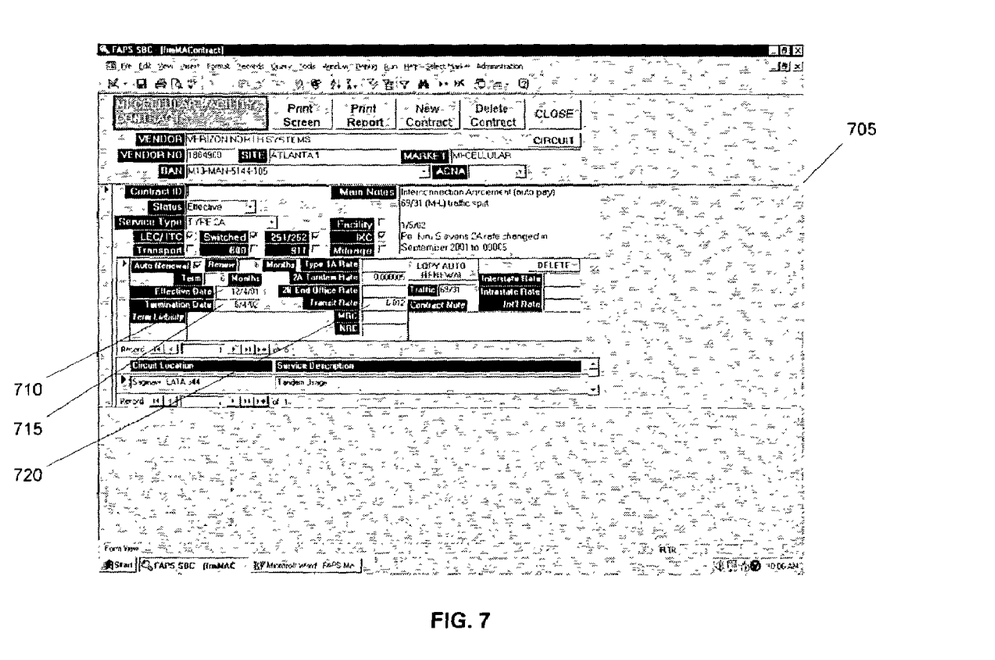
FIG. 7 is an illustration of an exemplary contract screen consistent with an embodiment of the present invention.

If it is determined at decision block 315 that the billed amount and the calculated amount do not differ by greater than the threshold amount, or from stage 330 where an explanation for the discrepancy is received, exemplary subroutine 210 advances to stage 335 where the billing parameters used to create the calculated amount are indicated. For example, even though the billed amount may be greater than the calculated amount, the difference may be so small that the cost to recoup the amount may be greater than the difference. As illustrated in FIG. 7, a programming module in server 190 may cause exemplary contract screen 705 to be displayed indicating the billing parameters used to create the calculated amount are indicated. For example, effective date 710, termination date 715, and transit rate 720 may be displayed.

Once the billing parameters used to create the calculated amount are indicated in stage 335, exemplary subroutine 210 advances to stage 340 where the billing parameters are maintained. For example, as new circuits are added and as contract or tariff information changes, corresponding changes may be made to the billing parameters located in server 190. Specifically, for example, a contract for a particular circuit may be renewed at a higher monthly charge, thus the billing parameters located in server 190 may be maintained to reflect this new higher monthly charge.

After the billing parameters are maintained in stage 340, exemplary subroutine 210 advances to decision block 345 where it is determined if the circuit is terminating. For example, a programming module located on server 190 may analyze termination date 715 comprising the billing parameters of a circuit and determine that termination of the circuit is eminent.

If it is determined at decision block 345 that the circuit is terminating, exemplary subroutine 210 advances to decision block 350 where it is determined if the circuit should be renewed. For example an engineer responsible for the circuit in question may be consulted to determine if the circuit in question should be renewed. If it is determined at decision block 350 that the circuit should be renewed, exemplary subroutine 210 advances to stage 355 where the circuit is renewed. For example, the engineer may indicate that the circuit is necessary for the secure and reliable operation of system 100 and therefore should be renewed. If it is determined at decision block 350 that the circuit should not be renewed, exemplary subroutine 210 advances to stage 360 where the circuit is terminated. For example, the engineer may indicate that the circuit is no longer necessary for the secure and reliable operation of system 100 and therefore should be terminated in order to reduce costs.

From stage 355 if the circuit is renewed, from stage 360 if the circuit is terminated, or from decision block 345 if the circuit is not terminating, exemplary subroutine 210 advances to stage 365 and returns to exemplary subroutine 220 of FIG. 2.

Figure 8:
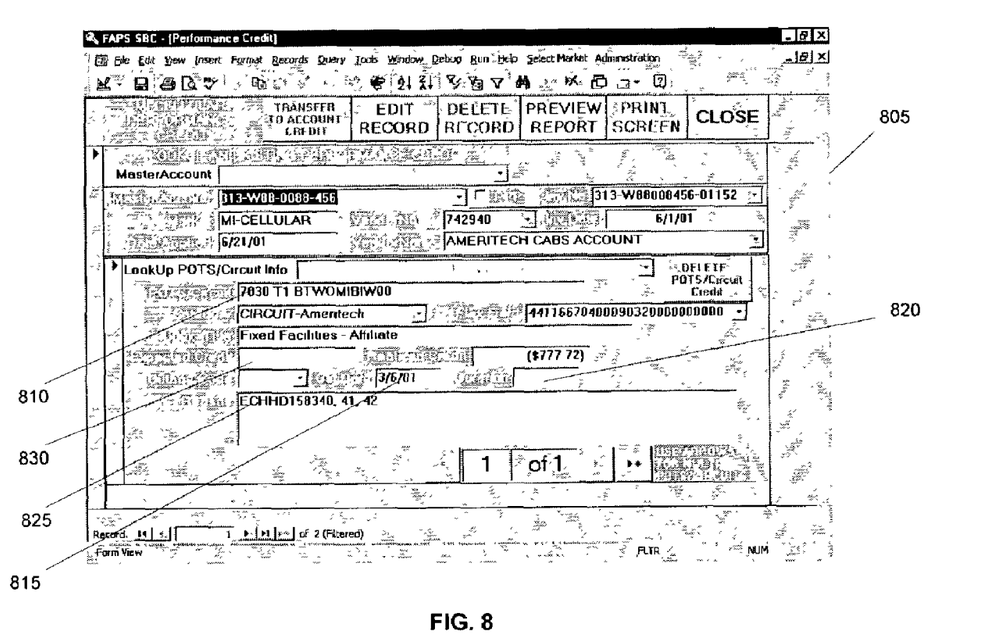
FIG. 8 is an illustration of an exemplary expected credit screen consistent with an embodiment of the present invention.

FIG. 9 describes exemplary subroutine 220 from FIG. 2 for tracking credit associated with at least one circuit outage. Exemplary subroutine 220 begins at starting block 905 and advances to stage 910 where outage data associated with the at least one circuit outage is received. For example, a programming module located on server 190 may cause workstation 194 to display exemplary expected credits screen 805 as illustrated in FIG. 8. The outage data may comprises a circuit ID 810, a date 815 the at least one circuit outage occurred a duration 820 of the at least one circuit outage, and the reason 825 the at least one circuit outage occurred. The outage data my be obtained from data collected by EMS 195 and may be received periodically.

From stage 910 where the outage data associated with the at least one circuit outage is received, exemplary subroutine 220 advances to stage 915 where an expected credit amount associated with the at least one circuit outage is received. For example, by a contractual arrangement or as defined by a tariff, if a circuit within system 100 is out for greater than a predetermined duration, the provider or vendor of the circuit may be required to pay an expected credit amount to those purchasing service from the circuit. This expected credit amount may be entered in expected credit area 830 as shown on screen 805 of FIG. 8.

Once the expected credit amount associated with the at least one circuit outage is received in stage 915, exemplary subroutine 220 advances to stage 920 where database 191 is updated with the expected credit amount associated with the at least one circuit outage. For example, once data is entered on screen 805, the data on screen 805 may be stored in database 191 located on server 190. Moreover, database 191 may be configured to maintain an accumulated expected credit amount reflecting the sum of multiple expected credit amounts associated with multiple outages if multiple circuit outages occur. For example, if a circuit is out on multiple occasions, database 191 may maintain a sum of each expected credit associated with each outage.

After database 191 is updated with the expected credit amount associated with the at least one circuit outage in stage 920, exemplary subroutine 220 advances to stage 925 where an invoice reflecting at least one of the expected credit amount associated with the at least one circuit outage and the accumulated expected credit is produced. For example, the provider or vendor of a particular circuit may receive an invoice reflecting the credit accumulated due to circuit outages. This amount may be reflected in payment for other service received from the service provider minus the expected credits.

After the invoice reflecting at least one of the expected credit amount associated with the at least one circuit outage and the accumulated expected credit is produced in stage 925, exemplary subroutine 220 continues to stage 930 and returns to stage 230 of FIG. 2.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method operating on a digital computer, the method comprising validating an invoice in a wireless telecommunication system by:
    receiving billing input data for a circuit, the billing input data including a billed amount;
    indicating a discrepancy if a billed amount and a calculated amount, which is based on automated billing parameters, differ by greater than a threshold amount; and
    displaying billing parameters used to calculate the calculated amount.

2. The method of claim 1, further comprising prompting for researching the cause of the discrepancy if the billed amount and the calculated amount differ by greater than the threshold amount.

3. The method of claim 1, further comprising receiving an explanation for the discrepancy if the billed amount and the calculated amount differ by greater than the threshold amount.

4. The method of claim 1, further comprising indicating a circuit is terminating based upon the expiration of a contract indicated by the billing parameters.

5. The method of claim 4, further comprising at least one of terminating the contract and renewing the contract.

6. The method of claim 1, wherein the threshold amount comprises at least one of an amount greater than zero and an amount equal to zero.

7. The method of claim 1, wherein the input data further comprises at least one of a circuit number and an invoice date.

8. The method of claim 1, wherein the billing parameters comprise at least one of a contract amount and a tariff.

9. The method of claim 1, further comprising receiving the calculated amount, wherein the calculated amount is based at least in part on the predefined billing parameters.

10. A digital computer system for validating an invoice in a wireless telecommunication system, comprising:
    a component for receiving billing input data for a circuit, the billing input data including a billed amount;
    a component for indicating a discrepancy if the billed amount and a calculated amount, which is based on automated billing parameters, differ by greater than a threshold amount; and
    a component for indicating billing parameters used to create the calculated amount.

11. The system of claim 10, further comprising a component for maintaining the billing parameters.

12. The system of claim 10, further comprising a component for prompting for researching the cause of the discrepancy if the billed amount and the calculated amount differ by greater than the threshold amount.

13. The system of claim 10, further comprising a component for receiving an explanation for the discrepancy if the billed amount and the calculated amount differ by greater than the threshold amount.

14. The system of claim 10, further comprising a component for indicating a circuit is terminating based upon the expiration of a contract indicated by the billing parameters.

15. The system of claim 14, further comprising at least one of a component for terminating the contract and a component for renewing the contract.

16. The system of claim 10, wherein the threshold amount comprises at least one of an amount greater than zero and an amount equal to zero.

17. The system of claim 10, wherein the input data further comprises at least one of a circuit number and an invoice date.

18. The system of claim 10, wherein the billing parameters comprise at least one of a contract amount and a tariff.

19. A computer-readable medium on which is stored a set of instructions, which when executed, perform a method for providing invoice validation in a wireless telecommunication system, the method comprising:
    receiving billing input data for a circuit, the billing input data including a billed amount;
    indicating a discrepancy if the billed amount and a calculated amount, which is based on automated billing parameters, differ by greater than a threshold amount; and
    indicating billing parameters used to create the calculated amount.

20. The computer-readable medium of claim 19, further comprising maintaining the billing parameters.

21. The computer-readable medium of claim 19, further comprising prompting for researching the cause of the discrepancy if the billed amount and the calculated amount differ by greater than the threshold amount.

22. The computer-readable medium of claim 19, further comprising receiving an explanation for the discrepancy if the billed amount and the calculated amount differ by greater than the threshold amount.

23. The computer-readable medium of claim 19, further comprising indicating a circuit is terminating based upon the expiration of a contract indicated by the billing parameters.

24. The computer-readable medium of claim 23, further comprising at least one of terminating the contract and renewing the contract.

25. The computer-readable medium of claim 19, wherein the threshold amount comprises at least one of an amount greater than zero and an amount equal to zero.

26. The computer-readable medium of claim 19, wherein the input data further comprises at least one of a circuit number and an invoice date.

27. The computer-readable medium of claim 19, wherein the billing parameters comprise at least one of a contract amount and a tariff.

28. A digital computer system for validating an invoice in a wireless telecommunication system, comprising:
    a memory for storing at least one set of billing parameters associated with a circuit;
    a processor for:
        receiving billing input data for the circuit, the billing input data including a billed amount from the invoice;
        calculating a calculated amount based at least in part on one or more sets of the billing parameters, and on usages data associated with the circuit; and
        indicating a discrepancy if the billed amount and the calculated amount differ by greater than a threshold amount; and
    an output device for communicating the billing parameters used to calculate the calculated amount.

* * * * *